(12) United States Patent
Velline et al.

(10) Patent No.: US 10,949,850 B1
(45) Date of Patent: Mar. 16, 2021

(54) SYSTEMS AND METHODS FOR USING LOCATION SERVICES TO DETECT FRAUD

(71) Applicant: Wells Fargo Bank, N.A., San Francisco, CA (US)

(72) Inventors: Jonathan G. Velline, Oakland, CA (US); Alicia Y. Moore, San Ramon, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 1112 days.

(21) Appl. No.: 15/055,192

(22) Filed: Feb. 26, 2016

Related U.S. Application Data (60) Provisional application No. 62/273,081, filed on Dec. 30, 2015.

(51) Int. Cl.
| | |
|---|---|
| *G06Q 20/40* | (2012.01) |
| *H04W 12/12* | (2021.01) |
| *H04W 68/00* | (2009.01) |
| *H04W 4/14* | (2009.01) |

(52) U.S. Cl.
CPC .......... *G06Q 20/4016* (2013.01); *H04W 4/14* (2013.01); *H04W 12/12* (2013.01); *H04W 68/005* (2013.01)

(58) Field of Classification Search
CPC ............... G06Q 40/02; G06Q 30/0269; G06Q 30/0609; G06Q 50/18; G06Q 20/4016; G06F 21/32; G06F 21/31; H04W 4/14; H04W 12/12; H04W 68/005
See application file for complete search history.

(56) References Cited

U.S. PATENT DOCUMENTS

| | | | | |
|---|---|---|---|---|
| 7,543,740 | B2* | 6/2009 | Greene | G06Q 20/40 235/375 |
| 8,600,872 | B1* | 12/2013 | Yan | G06Q 40/02 705/38 |
| 9,203,860 | B1* | 12/2015 | Casillas | H04L 63/1433 |
| 9,510,204 | B2* | 11/2016 | Haro | H04W 4/029 |
| 9,633,201 | B1* | 4/2017 | Katz | G06Q 40/02 |
| 9,838,872 | B2* | 12/2017 | Dennis | H04L 63/1416 |
| 2004/0138955 | A1* | 7/2004 | Song | G06Q 20/04 705/17 |
| 2006/0285665 | A1* | 12/2006 | Wasserblat | G06Q 20/4016 379/114.14 |

(Continued)

*Primary Examiner* — Mamon Obeid
*Assistant Examiner* — Jahed Ali
(74) *Attorney, Agent, or Firm* — Foley & Lardner LLP (57) ABSTRACT

Systems, methods, and apparatuses using a memory device and one or more processors communicably coupled to the memory device. The one or more processors are structured to receive information relating to a mobile device of a user; receive information regarding fraudulent activity on an account; associate the information regarding fraudulent activity on the account with one or more pieces of information relating to the mobile device to associate the mobile device with fraudulent activity; detect the mobile device based on the information relating to the mobile device; responsive to detecting the mobile device, determine that fraudulent activity is associated with the mobile device; and in response, provide a notification to a component proximate to the mobile device to alert the component of fraudulent activity.

14 Claims, 3 Drawing Sheets

(56) References Cited

U.S. PATENT DOCUMENTS

| | | | |
|---|---|---|---|
| 2007/0038568 A1* | 2/2007 | Greene | G06Q 50/188 705/50 |
| 2008/0010678 A1* | 1/2008 | Burdette | G06Q 30/0603 726/15 |
| 2008/0227471 A1* | 9/2008 | Dankar | H04W 4/023 455/456.6 |
| 2012/0203698 A1* | 8/2012 | Duncan | G06Q 20/34 705/44 |
| 2013/0197998 A1* | 8/2013 | Buhrmann | G06Q 20/4016 705/14.53 |
| 2013/0238499 A1* | 9/2013 | Hammad | G06Q 20/4018 705/44 |
| 2014/0058854 A1* | 2/2014 | Ranganath | G06Q 20/4016 705/16 |
| 2015/0073987 A1* | 3/2015 | Dutt | G06Q 20/4016 705/44 |
| 2015/0142595 A1* | 5/2015 | Acuna-Rohter | G06Q 30/06 705/21 |
| 2015/0348042 A1* | 12/2015 | Jivraj | G06Q 20/322 705/44 |
| 2016/0005029 A1* | 1/2016 | Ivey | G06Q 20/409 705/44 |
| 2016/0063457 A1* | 3/2016 | Liu | G06Q 20/3224 705/39 |
| 2016/0171499 A1* | 6/2016 | Meredith | G06Q 20/3224 705/44 |
| 2016/0227405 A1* | 8/2016 | Dennis | G06F 21/35 |
| 2018/0060954 A1* | 3/2018 | Yin | G06F 16/90335 |

\* cited by examiner

SYSTEMS AND METHODS FOR USING LOCATION SERVICES TO DETECT FRAUD

CROSS-REFERENCE TO RELATED APPLICATIONS

This application claims the benefit of priority of U.S. Provisional Patent Application No. 62/273,081, filed Dec. 30, 2015, which is incorporated by reference herein in its entirety.

TECHNICAL FIELD

Embodiments of the present disclosure relate generally to the field of fraud detection.

BACKGROUND

Financial institutions desire to detect and mitigate fraudulent activity. Fraudulent activity may include identity theft, forgery, credit/debit card fraud, wire fraud, loan fraud, and so on. Traditionally, fraud tracking may include generating a poster with identity information regarding a potential fraudster. The posters may be distributed to various locations, such as at a branch location of a financial institution or to law enforcement officials. Accordingly, personnel at those locations may identify the potential fraudster if the person is recognized in comparison with the poster. However, people may change their looks and the personnel may not carefully examine the posters, such that the efficacy of such posters is relatively low. In this regard, tracking these individuals by providing posters or notifying individual branches may not provide efficient or effective results.

SUMMARY

A first exemplary embodiment relates to an identity management system. An identity management system includes a memory device and one or more processors communicably coupled to the memory device. The one or more processors are structured to: receive information relating to a mobile device of a user; receive information regarding fraudulent activity on an account; associate the information regarding fraudulent activity on the account with one or more pieces of information relating to the mobile device to associate the mobile device with fraudulent activity; detect the mobile device based on the information relating to the mobile device; responsive to detecting the mobile device, determine that fraudulent activity is associated with the mobile device; and in response, provide a notification to a component proximate to the mobile device to alert the component of the fraudulent activity.

Another exemplary embodiment relates to a method. The method includes receiving, by a detection circuit of an identity management system comprising one or more processors communicably and operatively coupled to a memory device, information relating to a mobile device of a user; receiving, by an association circuit, information regarding fraudulent activity on an account of the user; associating, by the association circuit, the information regarding fraudulent activity on the account with one or more pieces of information relating to the mobile device to associate the mobile device with fraudulent activity; receiving, by a detection circuit, information indicative of the mobile device being detected at a location; responsive to receiving information indicative of the mobile device being detected, determining, by fraud logic, fraudulent activity is associated with the mobile device; and in response, providing, by alert logic, a notification to a component proximate to the mobile device to alert the component of the mobile device associated with fraudulent activity.

A further exemplary embodiment relates to an apparatus. The apparatus includes an association circuit structured to associate a mobile device and fraudulent activity on an account at a financial institution; a detection circuit structured to detect and identify the mobile device; and fraud logic structured to: determine that activity on the account is fraudulent; determine a rating for the fraudulent activity; and alert a component proximate to the mobile device of the fraudulent activity based at least on the rating for the fraudulent activity.

These and other features, together with the organization and manner of operation thereof, will become apparent from the following detailed description when taken in conjunction with the accompanying drawings.

DETAILED DESCRIPTION

Referring to the Figures generally, various systems, methods, and apparatuses relate to an identity management system structured to detect and identify mobile devices that may be linked to fraudulent activity. According to the present disclosure, the identity management system may facilitate association of a mobile device with one or more occurrences of potentially fraudulent activity. Subsequently, the identity management system may detect and identify the mobile device in a location (e.g., a branch location of a financial institution). In response, the identity management system may determine that the detected mobile device is associated with potentially fraudulent activity. According to one embodiment, the identity management system may determine the identity of one or more mobile devices located at a branch of the financial institution at the point in time when the potentially fraudulent activity occurred and flag those mobile devices as being possibly associated with an occurrence of potentially fraudulent activity. Based on information indicating the presence of one or more of the flagged mobile devices, the identity management system may cause transmission of an alert (e.g., message) to a component proximate to the location of the mobile device (e.g., to a computer of a teller at the branch location where the mobile device was detected). In this regard, the component may facilitate preventing or substantially preventing additional fraudulent activity.

An example implementation may be described as follows. The identity management system may associate a mobile device with potentially fraudulent activity by receiving information regarding that mobile device at the time of an occurrence of such activity. For example, a fraudster (e.g., person or entity attempting to perform or facilitating performance of fraudulent activity) may have or attempted to commit fraud on an account at the financial institution. At the time of the potential fraudulent activity, there may be one or more mobile devices located at a branch where such activity may have occurred. The fraudulent activity may include unauthorized use of an account at the financial institution or any other activity indicative of fraudulent activity (e.g., unauthorized withdrawals from the account, bounced checks). For example, the transaction may have been later determined to be fraudulent after having been reported as fraudulent by the valid account holder. In another example, if a fraudster tries to cash checks that have already been cashed elsewhere, and the individual was carrying a mobile device when trying to cash the checks, the mobile device associated with that individual may be flagged as associated with potential fraudulent activity. Rather than providing posters to various institution locations (e.g., bank branch locations) to flag the potential fraudster, the identity management system may flag the mobile devices located at the branch location during the time of the occurrence of the fraudulent activity. Accordingly, if the one or more flagged mobile devices are detected at a location, the identity management system may send an alert to personnel in that location to monitor, contact, or otherwise engage the entity believed to be associated with the mobile device.

Beneficially, such actions promote optimized fraudster identification by operating in a proactive fashion. Further, rather than causing transmission (paper or electronic) of fraud alerts, the fraud alerts are transmitted in a selective manner based on detection of a mobile device associated with fraudulent or potential fraudulent activity. In this regard, personnel at the various locations may be less likely to become inundated with several notices (e.g., please watch for the following X people), where the likelihood of detection of any one of those subjects is unlikely. According to the present disclosure, by operating in a more one-to-one manner (e.g., detecting a mobile device associated with fraudulent activity and providing a message or alert in response), the identity management system may promote better alerts of potential imminent fraudulent activity. Additionally, the fraud alerts may be made in a more timely manner. Branch personnel receive the alert when the potential fraudster enters the branch, rather than simply being provided with a list of individuals to watch for "in general," untethered to anything that is actually happening in the branch location at the time. Also, beneficially, the systems and methods may be used even in situations where the fraudster is not an account holder at the financial institution. Because mobile device(s) are flagged, instead of accounts, any mobile device, whether or not belonging to an account holder, may indicate the presence of a fraudster in a financial institution location.

The systems, methods, and apparatuses of the present disclosure may also reduce memory and bandwidth requirements in tracking fraudulent activity. Specifically, because of the aforementioned one-to-one reactionary behavior, the systems, methods, and apparatuses may only selectively provide alerts instead of constant and numerous alerts, which may reduce data transfer requirements. Additionally, the systems, method, and apparatuses of the present disclosure may be configured to be operated at least partly on a mobile device application, thereby requiring less storage for identification of a potential fraudster by the financial institution. Thus, the need for large amounts of data storage on servers at financial institution(s) may be reduced. These and other features of the present disclosure are described more fully herein below.

Figure 1:
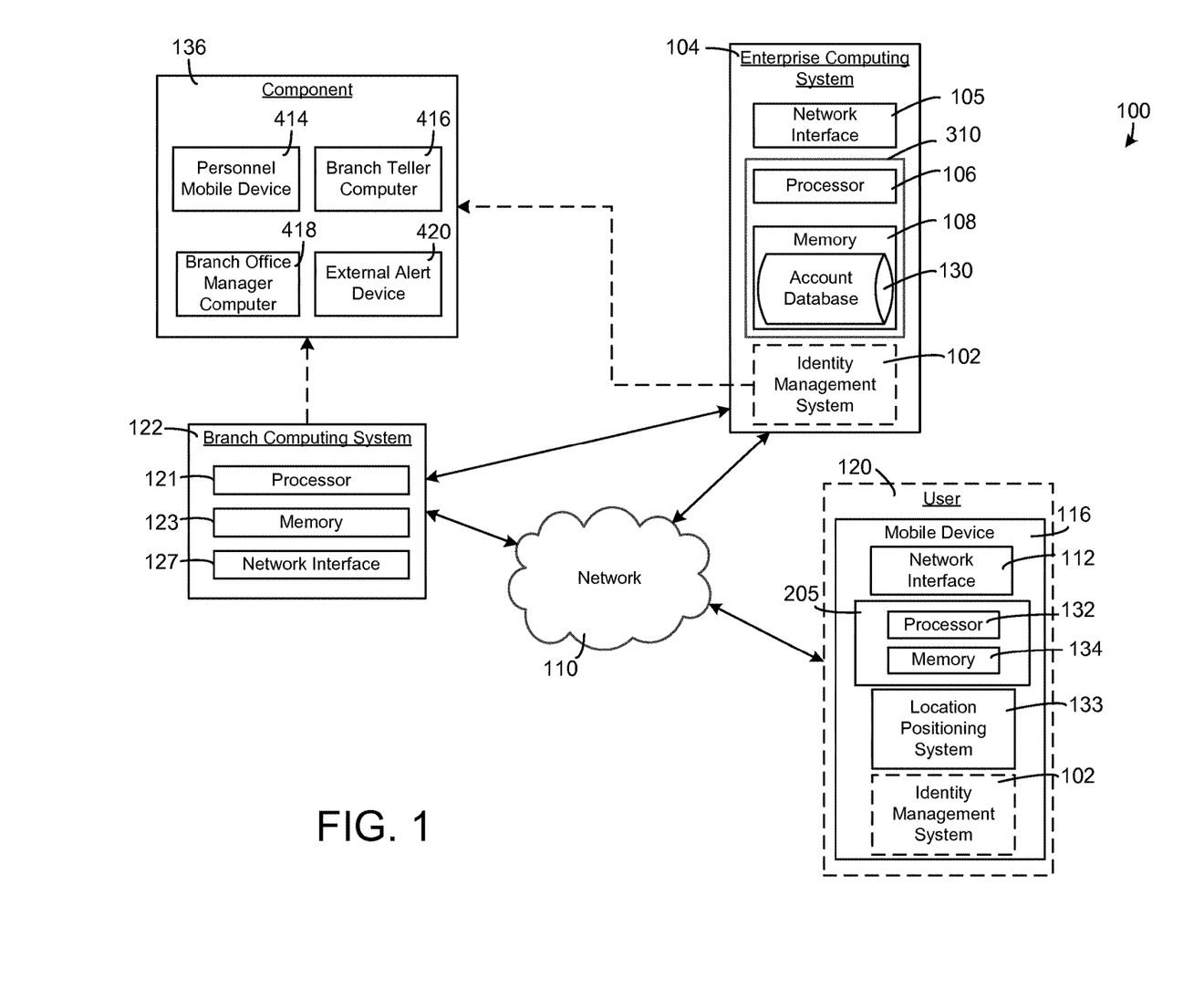
FIG. 1 is a schematic diagram of an identity management system, according to an example embodiment.

Referring now to FIG. 1, a diagram of a system 100 is shown according to an example embodiment. As described in further detail below, the system 100 may facilitate identifying mobile devices 116 in a financial institution environment to detect a mobile device that may be associated with fraudulent or potentially fraudulent activity. In response, the system 100 may transmit a notification to one or more components 136. For example, the notification may be sent to personnel known to work or be at a branch of the financial institution, a computer at the branch location, law enforcement officials, and so on. As shown, the system 100 may include an enterprise computing system 104 communicably and operatively coupled to one or more branch computing systems 122, one or more mobile device(s) 116 associated with one or more users 120, a component 136, and a network 110. The network 110 may provide communicable and operative coupling between the mobile device(s) 116 and the enterprise computing system 104, branch computing system 122, and the other components disclosed and described herein to provide and facilitate the exchange of communications (e.g., data, instructions, values, commands, etc.). Accordingly, the network 110 may include any network including wired (e.g., Ethernet) and/or wireless networks (e.g., 802.11X, ZigBee, Bluetooth, Internet, etc.). In some embodiments, the network 110 may further include a proprietary banking network to provide secure or substantially secure communications.

The user 120 may be any person or entity using the mobile device 116. Such a user 120 may be authorized (e.g., the owner of the mobile device) or unauthorized (e.g., a thief of the mobile device). Further, such a user 120 may be the party responsible for fraudulent or potentially fraudulent activity or a non-responsible party. Accordingly, the user 120 may be any user or entity associated with the mobile device 116. The user 120 may be a customer or account holder of a financial institution. In other arrangements, the user 120 may not be a customer or account holder at the financial institution.

The mobile device 116 may include any type of mobile device 116 that may be associated with the user 120. In this regard, the mobile device 116 may include any type of wearable device. Wearable devices refer to any type of device that a user 120 wears including, but not limited to, a watch (e.g., a smart watch), glasses (e.g., eye glasses, sunglasses, smart glasses, etc.), bracelet (e.g., a smart bracelet), etc. Mobile devices 116 may also include any type of mobile device 116 of a user 120 including, but not limited to, a phone (e.g., smartphone, etc.) and a computing device (e.g., tablet computer, laptop computer, person digital assistant, etc.).

As shown, the mobile device 116 includes a processing circuit 205, which may include a processor 132, a location positioning system 133, memory 134, and a network interface 112. The network interface 112 of the mobile device 116 may be adapted for and configured to establish a communication session via the network 110 with the enterprise computing system 104 and/or the branch computing system 122. Accordingly, the network interface 112 may include any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The processing circuit 205 may include a processor 132 and a memory 134. The processor 205 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 134 (e.g., RAM, NVRAM, ROM, Flash Memory, hard disk storage, etc.) may store data and/or computer code for facilitating the various processes described herein. Moreover, the one or more memory devices 134 may be or include tangible, non-transient volatile memory or non-volatile memory. Accordingly, the one or more memory devices 134 may include database components, object code components, script components, or any other type of information structure for supporting the various activities and information structures described herein.

The mobile device 116 may include a location positioning system 133, which may be used to determine or facilitate determination of a location of the mobile device 116 (e.g., in, at, or near a financial institution location). Accordingly, the location positioning system 133 may include any type of location positioning sensor or chip (e.g., a Global Positioning System (GPS) sensor) that may be used to determine the location of the mobile device 116.

Still referring to FIG. 1, the system 100 also includes an enterprise computing system 104. The enterprise computing system 104 may be associated with or operated by a financial institution (e.g., a bank, a credit card issuer, etc.) or any other entity(ies) interested in tracking and mitigating fraudulent activity. When embodied as a financial institution computing system, the enterprise computing system 104 may be operated by a financial institution that maintains accounts held by the user 120, such as demand deposit accounts, credit card accounts, home mortgage loans, student loans, and so on. In practice, the enterprise computing system 104 may include server computing systems, for example, comprising one or more networked computer servers having a processor and non-transitory machine readable media.

As such, the enterprise computing system 104 may include a network interface 105, which may be used to establish connections with other components of the system 100 by way of network 110. The network interface 105 may include program logic that facilitates connection of the enterprise computing system 104 to the network 110. The network interface 105 may support communication between the enterprise computing system 104 and other systems, such as the mobile device 116 and the branch computing system 122. For example, the network interface 105 may include a cellular modem, a Bluetooth transceiver, a Bluetooth beacon, a radio-frequency identification (RFID) transceiver, and a near field communication (NFC) transmitter. In some arrangements, the network interface 105 may include hardware and machine-readable media sufficient to support communication over multiple channels of data communication. Further, the network interface 105 may include cryptography capabilities to establish a secure or relatively secure communication session with the enterprise computing system 104 and branch computing system 122 or another device in communication with the mobile device 116. In this regard, financial data (or other types of data) may be encrypted and transmitted to prevent or substantially prevent the threat of hacking.

The enterprise computing system 104 may further include an account database 130. The account database 130 may hold, store, categorize, and otherwise serve as a repository for the accounts and activities of account holders of the financial institution, as well as information related to mobile devices 116 that may be associated with potential fraudulent activity at the financial institution. The account database 130 may be structured to provide information relating to accounts held at the financial institution, such as an account number, name, email address, physical address, and phone number of the account holder. The account database 130 may additionally be structured to provide access to information relating to mobile devices 116 that may have been flagged as associated with potential fraudulent activity. Various customer profile characteristics may be stored by the account database 130. The customer profile characteristics may include, but are not limited to, account numbers and types of accounts, various statements (e.g., credit/debit statements for the accounts), transaction information, flagged fraudulent activity and associated mobile devices, and so on.

The account database 130 may be structured to selectively provide access to accounts associated with flagged fraudulent activity. In this regard, the account database 130 may be communicably and operatively coupled to the identity management system 102 to associate mobile devices 116 of a user 120 with flagged fraudulent activity within the account database 130.

Still referring to FIG. 1, the system 100 may also include a branch computing system 122. As used herein, the "branch location" refers to any location of interest for the identity management system 102 to monitor (e.g., to detect mobile devices associated with fraudulent activity therein). As shown and described herein, the "branch location" may be structured as a branch location of a financial institution (e.g., a local branch). In this regard, the "branch location" may be communicably coupled to the enterprise computer system 104 via the network 110. The branch computing system 122 may be structured to receive information from the identity management system 102 relating to potential fraudulent activity and the presence of individuals potentially involved with fraudulent activity. Thus, the branch computing system 122 may be included on or communicably coupled to the enterprise computing system 104 and/or the mobile device 116 via the network 110. In some embodiments, the branch computing system 122 may be further structured to notify one or more appropriate entities (e.g., component 136) of fraudulent activity and/or the presence of individuals potentially involved in fraudulent activity in response to one or more instructions, commands, or messages from the identity management system 102. In that regard, the branch computing system 122 may include hardware capable of detecting mobile device identifiers and providing a list of all mobile devices 116 associated with those identifiers that may be in a financial institution location (e.g., branch of the financial institution) at a certain point in time. Thus, the branch computing system 122 may support at least some of the operations of the identity management system 102 by detecting mobile devices 116 and acting to notify an appropriate component 136 of potential fraudulent activity and/or the presence mobile device(s) 116 associated with fraudulent activity. In this regard, component 136 may be included on the enterprise computing system 104.

Figure 2:
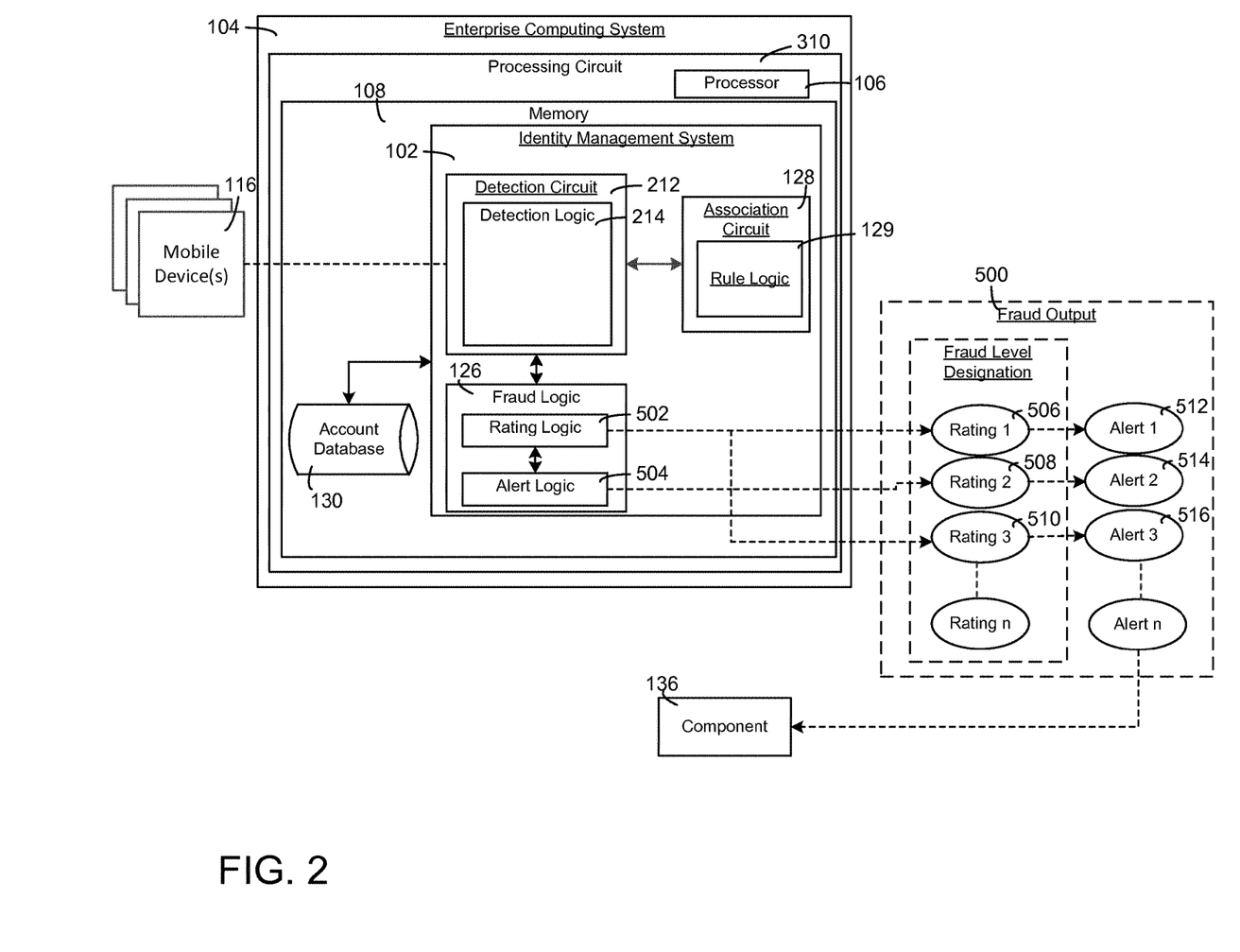
FIG. 2 is a diagram of the identity management system of FIG. 1, according to an example embodiment.

Referring now to FIG. 2, a diagram of the identity management system 102 and part of the enterprise computing system 104 of FIG. 1 are shown according to an example embodiment. It should be understood that in one embodiment and in the example depicted, the enterprise computing system 104 includes the identity management system 102. However, in another embodiment, the identity management system 102 may be provided with the mobile device 116 (e.g., as an application operable on the mobile device 116). All such variations are intended to fall within the scope of the present disclosure.

As shown, the enterprise computing system 104 includes a processing circuit 310, which may further include a processor 106 and a memory 108. The processor 310 may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices 108 (e.g., RAM, NVRAM, ROM, Flash Memory, hard disk storage, etc.) may store data and/or computer code for facilitating the various processes described herein. Moreover, the one or more memory devices 108 may be or include tangible, non-transient volatile memory or non-volatile memory. Accordingly, the one or more memory devices 108 may include database components, object code components, script components, or any other type of information structure for supporting the various activities and information structures described herein.

As mentioned above and in this example, the identity management system 102 may be embodied with the enterprise computing system 104. Accordingly, in this example, the identity management system 102 may be embodied or at least partly embodied in the memory 108, where at least some operations may be executable from the processing circuit 310. In another embodiment and as shown in FIG. 1, the identity management system 102 may be embodied on or with the mobile device 116. In this example, the identity management system 102 may be a server-based application executable on the mobile device 116. In this regard, a user 120 may have to first download the application(s) prior to their usage. In another example, the identity management system 102 may be hard coded into the memory of the mobile device 116. In this regard, the identity management system 102 may be supported by a separate computing system comprising one or more servers, processors, network interface modules, etc. that transmit the applications for use to the mobile device 116. In certain examples, the identity management system 102 may include an application programming interface (API) and/or a software development kit (SDK) that facilitate the integration of other applications. All such variations and combinations are intended to fall within the spirit and scope of the present disclosure.

The identity management system 102 is shown to include a detection circuit 212, an association circuit 128, and fraud logic 126. The detection circuit 212, association circuit 128, and fraud logic 126 may be structured to detect and identify a mobile device 116 of a user 120 in, at, or near a location (e.g., the branch location) via the network 110 and through a mobile device identifier (e.g., Internet Protocol (IP) address, phone number, frequency identifier). Further, these circuits may be structured to determine that certain activity is fraudulent and associate detected and identified mobile devices 116 with occurrences of potential fraudulent activity. Responsive to detecting and identifying the mobile device 116 associated with fraudulent activity, the identity management system 102 may provide a message to a component 136 proximate the mobile device 116. Referring back to FIG. 1, the "component" is shown to include a personnel mobile device 414, a branch teller computer 416, a branch office manager computer 418, and an external alert device 420. In this regard and as used herein, the term "component" is meant to be broadly defined and generally refers to any device that may be chosen or designated by the identity management system 102 to receive the alert proximate the mobile device 116. Upon reception of the alert, the component 136 may facilitate preventing and inhibiting any other fraudulent activity with respect to that account.

For instance, a user 120 may enter the financial institution with a mobile device 116 and the detection circuit 212 may detect the mobile device 116. After detecting the mobile device 116, the identity management system 102 may then identify the device by a mobile device identifier (e.g., a phone number) using a detection circuit 212 and associate the device with potentially fraudulent activity using an association circuit 128. The identity management system 102 may then use fraud logic 126 to alert one or more components 136 through the use of rating logic 502 and alert logic 504.

The detection circuit 212 may be structured to detect or receive an indication of a detected mobile device 116 in a detection area and identify that mobile device 116 by a mobile device identifier. As used herein, the term "detection area" may refer to a user-defined region of interest. According to one embodiment, the detection area may include a branch of the financial institution (e.g., the branch location) and may further include a specific area within that branch (e.g., an area in front of a branch teller window). According to another embodiment, the detection area may include a wireless network coverage area of a location (e.g., the branch location). In another embodiment, the detection area may include any other area of interest for fraudulent activity detection and mitigation and/or potential fraudster detection. As used herein, the phrase "mobile device identifier" may refer to any information associated with a mobile device that may be used to uniquely identify a mobile device. In this regard, the mobile device identifier may be any piece of information that is tied to, linked with, or associated with one mobile device (i.e., part of the unique "fingerprint" of the mobile device). Such information may be permanent or transient in nature, but is preferably at least semi-permanently associated with only one mobile device. In one embodiment, the mobile device identifier may include a phone number of the mobile device 116. In another embodiment, the mobile device identifier may include an IP address of the mobile device 116. In still another embodiment, the mobile device identifier may include a frequency identifier of the mobile device 116. In other embodiments, the mobile device identifier may include any other information that may be used to uniquely identify the mobile device 116. The detection circuit 212 may determine the identity of the mobile device 116 based on those unique identifiers.

To facilitate detection and identification, the detection circuit 212 may include various hardware components, such as a wireless router, Bluetooth beacon, and frequency reader. In one example, the detection circuit 212 may include a wireless router. The wireless router may receive a notification that a mobile device 116 may be within or near the detection area via a wireless network 110. The wireless router may receive a request from the mobile device 116 to join the network 110 or may otherwise be aware of the mobile device 116 via the wireless network 110. The wireless router may additionally receive unique mobile device identifiers, such as an Internet Protocol (IP) address or media access control (MAC) address of the mobile device 116. Thus, if the detection area is the wireless network coverage range, the detection circuit 212 may detect and identify each mobile device 116 that may be within that range based on or more of the mobile device identifiers.

In another example, the detection circuit 212 may include a Bluetooth beacon. The detection circuit 212 may determine the location of the mobile device 116 and the identification of that mobile device 116 via the beacon. As an example, a Bluetooth beacon located at a branch of a financial institution may send out signals via Bluetooth and may communicate with mobile device(s) 116 that are equipped with Bluetooth capability to determine the location and identification of any mobile device 116 within, at, or near a financial institution location. In this regard, the financial institution may provide a mobile application configured to exchange data between a mobile device 116 and a detection circuit 212. In response to a beacon signal, the mobile device 116 may provide a location relative to a certain beacon located at a financial institution location (e.g., near a teller window).

In still another example, the detection circuit 212 may include a frequency reader. The frequency reader may detect a mobile device 116 by the wireless signals the mobile device 116 may emit. In this regard, the mobile device 116 may emit wireless signals at uniquely different frequencies such that each mobile device 116 may be identified by the detection circuit 212 via the network 110 and determined to be within the detection area. Accordingly, the detection circuit 212 may utilize radio-frequency identification (RFID) or near-field communication (NFC) to detect and identify mobile devices 116 in or near the detection area.

In yet another example, the detection circuit 212 may include machine-readable media stored by the memory 108 and executable by the processor 132, wherein the machine-readable media may support communication between the identity management system 102 and the mobile device 116 to facilitate detection and identification of the mobile device 116. Such machine-readable media may include applications such as Wireless Network Watcher and Fing that may be installed on a computer, router, or mobile device located at the financial institution to identify mobile devices 116 that are connected to the wireless network 110 within the detection area. By tracking devices by IP address, MAC address, frequency identifier, and so on, the detection circuit 212 may identify those mobile devices 116 that may be within the detection area such that the identity management system 102 may associate those identified devices 116 with an occurrence of potential fraudulent activity.

In another example, the detection circuit 212 may include any combination of hardware components, as described above, and machine-readable media. As described herein, the identity management system 102 may utilize one or more of these circuits to extract or provide details regarding the mobile device 116.

The identity management system 102 may further include an association circuit 128. As used herein in regard to the association circuit 128, the term "association" is meant to be broadly interpreted and refers to the linking of a mobile device identifier with potential fraudulent activity. By associating the mobile device 116 with potential fraudulent activity via the detection circuit 212 and the association circuit 128, the user 120 of the mobile device 116 may be apprehended as a potential fraudster at or near the detected location of the mobile device 116.

According to the example shown in FIG. 2, the association circuit 128 may include rule logic 129 to associate a mobile device identifier with one or more occurrences of fraudulent activity. The rule logic 129 may be structured to associate one or more mobile device identifiers with one or more occurrences of fraudulent activity. In this regard, the rule logic 129 may include a programmable definition for coupling or otherwise linking a mobile device identifier to one or more fraudulent activity occurrences.

The rule logic 129 may be communicably coupled to the detection circuit 212 such that one or more detected mobile devices 116 may be associated with potential fraudulent activity. In this regard, the rule logic 129 may associate one or more mobile devices 116 with an occurrence of fraudulent activity and flag the mobile devices 116 as being associated with fraudulent activity in the account database 130, such that the flagged mobile devices may be monitored. The rule logic 129 may maintain, for all mobile devices detected within branch locations, a log of each when the mobile device was detected within a branch location, and whether any fraudulent transactions occurred when the mobile device was in the branch location.

As an example, a mobile device 116 may be flagged because it was at a branch location when and where fraudulent activity has occurred or is occurring. The mobile device 116 may be flagged each time the device 116 is detected at a financial institution location when potential fraudulent activity has occurred. Accordingly, the number of flags a mobile device 116 has received may indicate to the financial institution whether a particular mobile device 116 is highly correlated with fraudulent activity. That is, if a mobile device 116 has been in branch locations numerous times with no instances of fraud, then that would suggest a low correlation with fraudulent activity. Conversely, if a mobile device 116 has been in branch locations less often but with several instances fraud, then that would suggest a higher correlation with fraudulent activity. In this configuration, if a mobile device 116 that has a high correlation with fraudulent activity is at a branch location when another instance of fraudulent activity occurs, that mobile device 116 may be deemed to be the most likely culprit of the fraudulent activity. Thus, if there are ten mobile devices 116 at the branch location when that instance of fraudulent activity occurs, the mobile device 116 that has previously been associated with fraud may be pinpointed as the most likely culprit, while the other nine mobile devices 116 may just be flagged as being present in the branch at that time. This information may be used to tailor the alert that is provided when a mobile device 116 enters a branch location. That is, mobile devices 110 that are highly correlated with fraud may trigger a higher level alert than mobile devices 110 that were simply present at the time. Further, the mobile devices that were simply present at the time, and where there was another more likely culprit present that may have perpetrated the fraud, may receive an even lower level alert or none at all.

The identity management system 102 may further include fraud logic 126. The fraud logic 126 may be structured to determine or receive an indication that certain account activity regarding one or more accounts is fraudulent or potentially fraudulent and designate such activity as fraudulent in the account database 130. In one embodiment, the fraud logic 126 may include one or more circuits for determining that certain account activity is fraudulent or potentially fraudulent in nature. For example, the fraud logic 126 may include and use one or more of advanced analytics, such as linear models, artificial neural networks (ANN), and decision trees, and the like to determine that activity may be fraudulent in nature. As another example, the fraud logic 126 may be structured to perform a social network analysis, such as using a social network, linkage analysis, community detection, and advanced analytics together to determine possible fraudulent activity. As another example, the fraud logic 126 may include data mining processes and/or anomaly detection processes to flag fraudulent activity on an account held by the financial institution. In yet another example, the fraud logic 126 may apply a hybrid of various fraud detection techniques described above to determine that activity is fraudulent or may apply any other fraud technique, and combinations thereof. In some embodiments, the fraud logic 126 may set varying levels or ratings of fraudulent activity based on the nature of the fraudulent activity, as discussed further herein. The ratings may be stored in the account database 130.

As shown, the fraud logic 126 may include rating logic 502 and alert logic 504. The rating logic 502 may be structured to designate ratings or levels of fraudulent activity and the alert logic 504 may designate corresponding alerts to one or more components 136 at the financial institution.

As mentioned above and as shown in the example embodiment in FIG. 2, the rating logic 502 may be structured to designate a rating. For example, in FIG. 2, several fraud ratings are showing, including Rating 1 (506), Rating 2 (508), and Rating 3 (510). The rating may be determined by determining a fraud risk score associated with the individual under consideration. A rating may then be assigned based on the score that is determined (e.g., 0-25 yields no alert; 26-50 yields Alert 1; 51-75 yields Alert 2; and 76-100 yields Alert 3). The fraud risk score may be a determined as a function of the severity of past instances of fraudulent activity, as well as the certainty that the mobile device 100 (i.e., potential fraudster associated with the mobile device) was the perpetrator of those fraudulent activities.

The alert logic 504 may also be structured to produce one or more fraud outputs 500, which may result in one or more alert types sent to a component 136 (e.g., personnel mobile device 414, branch teller computer 416, branch office manager computer 418, law enforcement officials via a device 420, etc.) in or related to the financial institution. In this regard, the alert logic 504 may be communicably and operatively coupled to the rating logic 502 and each component 136. A resultant component 136 notification may be assigned with each rating of fraud output 500. Thus, based on the rating of the fraudulent activity, alerts may be sent to different components 136. As an example, if a rating is relatively more severe, the alert may be sent to a component 136 with a relatively higher authority, such that the authority of the component 136 receiving the alert may correspond to the severity of the fraudulent activity. In this regard, the personnel at the branch may have a relatively lower authority than a manager at the branch, which in turn, may have a relatively lower authority than law enforcement officials. As such, if Rating 1-3 is in order of increasing severity, for Rating 1 fraud output 506, a corresponding notification may be alerting the branch personnel, for Rating 2 fraud output 508, a corresponding notification may be alerting the branch office manager, for Rating 3 fraud output 510, a corresponding notification may be alerting law enforcement officials, and so on.

In the example shown, Alert 1 (512) is associated with Rating 1 (506), Alert 2 (514) is associated with Rating 2 (508), and Alert 3 (516) is associated with Rating 3 (510), such that each rating corresponds to a different alert. For example, Alert 1 (512) may be a pop-up message to a personnel computer at the branch of the financial institution or a Short Message Service (SMS) message or electronic message to a mobile device of such personnel, Alert 2 (514) may be the same as Alert 1 plus a similar message to the manager located at the branch, and Alert 3 (516) may be the same as Alert 2 plus a call or message to law enforcement officials.

In some embodiments, other various responses may be used, e.g., to place limits or freezes on account activity in the event that the alert is not noticed by bank personnel. For example, the alert logic 504 may be structured to freeze the accounts associated with fraudulent activity and/or limit the activity on the accounts, e.g., in situations where the potential fraudster has previously committed or attempted to commit identity theft with respect to an account holder of certain accounts. Such a freeze may be done on a limited time basis while the mobile device 116 is in the detected location. As a result, activity with respect to the user 120 of the mobile device 116 may be monitored to determine if that user may be a potential fraudster. In another embodiment, the alert logic 504 may be structured to limit the amount of withdrawal or spending that may occur on an account. In still another embodiment, the alert logic 504 may be structured to limit the geographic location in which debit or credit cards on the account may be used. In yet another embodiment, the alert logic 504 may be structured to limit the types of activity that may occur on an account (e.g., transfers, withdrawals, deposits). These and various other actions may be taken by the financial institution through the alert logic 504 to prevent fraudulent activity on one or more accounts. In some embodiments, as shown in FIG. 1, the alert logic 504 may be structured to send the appropriate alert or response to the branch computing system 122, which may then designate the appropriate component 136 to notify.

In another embodiment, the alert logic 504 may require additional information prior to any other action being taken on an account. If fraudulent activity occurs on an account at the financial institution, the alert logic 504 may require additional input by the user 120, branch personnel, or other financial institution personnel before any other action may occur on the account. As an example, if an individual enters a branch of the financial institution and a mobile device of that individual is detected and associated with possible fraudulent activity on one or more accounts, the teller at that location may be required to input additional information (factors of authentication) prior to granting a withdrawal or other activity on that account. Such additional information may be displayed on a landing page (e.g., splash page) of a personnel (e.g., teller) computer at the branch location and provided by the alert logic 504. Before proceeding to the next page, the teller may be prompted to input additional information regarding the individual or the account(s) of the individual. Similarly, a loan officer may be required to input additional information prior to opening a loan for the individual possibly associated with fraudulent activity. As a further example, the user 120 of a mobile device 116 associated with fraudulent activity may be prompted to report to personnel at the branch location if they are attempting to withdraw money from an automated teller machine (ATM) at that location.

In some embodiments, the component 136 (e.g., personnel known to work or be at the branch) receiving the notification may be required to provide a response to the notification. For example, the response may relate to performing a task related to the notification, such as inputting additional information relating to a transaction or alerting further personnel at the financial institution branch, other branch location, or centralized location, etc. Additionally, in cases where the user 120 associated with the mobile device 116 is no longer in or near the store, the response may include notifying law enforcement officials.

Referring to FIGS. 1-2, the identity management system 102 may detect, identify, and associate a mobile device 116 with fraudulent activity on one or more accounts at the financial institution such that a notification may be sent to a component 136 regarding the presence of a mobile device 116 associated with potential fraudulent activity in a location of interest.

Figure 3:
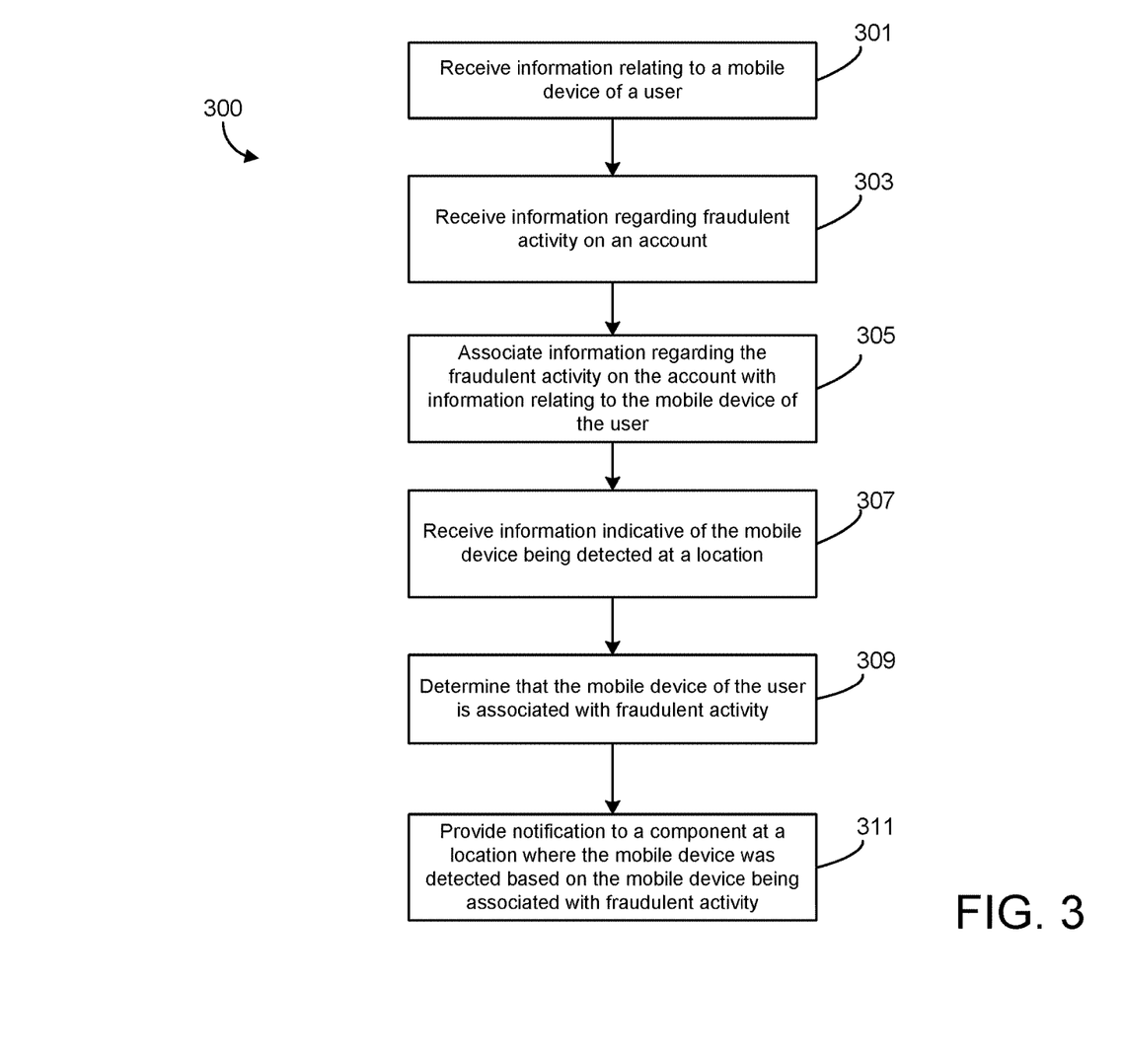
FIG. 3 is a flow diagram of a method of identifying a mobile device of a user associated with fraudulent activity, according to an example embodiment.

Referring now to FIG. 3, an example method of preventing fraud is depicted. Method 300 may be implemented with the identity management system 102 of FIGS. 1-2, such that reference may be made to one or more components of FIGS. 1-2 in explaining method 300.

At process 301, the identity management system receives information relating to a mobile device. The information relating to a mobile device 116 may include a mobile device identifier. As described herein above, the mobile device identifier may include any information associated with a mobile device 116 that may be used to uniquely identify a mobile device 116. Accordingly, the mobile device identifier may include, but is not limited to, a phone number, an IP address, and a frequency identifier of the mobile device 116.

At process 303, the identity management system receives information regarding fraudulent activity on an account. The information is used to log an instance of fraudulent activity potentially involving the mobile device 110. Specifically, at process 305, the identity management system associates information regarding the fraudulent activity on the account with information relating to a mobile device of the user. Process 305 may be performed by the association circuit 128 using rule logic 129 as shown and described in FIG. 2 above.

At process 307, the identity management system receives information indicative of the mobile device being detected at a location. The mobile device 116 may be detected using a detection circuit 212 in connection with one or more unique mobile device identifiers (e.g., phone number, IP address, frequency identifier).

At process 309, the identity management system determines that the mobile device of the user is potentially associated with fraudulent activity. The fraud logic 126 may determine or receive an indication that certain account activity regarding one or more accounts is fraudulent or potentially fraudulent and designate such activity as fraudulent in the account database 130.

At process 311, the identity management system provides a notification to a component at a location where the mobile device was detected based on the mobile device being associated with fraudulent activity. The notification may be providing an alert, wherein the alert can be provided as an email message, a text message, a pop-up window on branch teller's computer, etc. As described herein above, based on the rating of the fraudulent activity, an alert may be sent to specific component 136.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. An identity management system comprising:
  a memory device; and
  one or more processors communicably coupled to the memory device, wherein the one or more processors are structured to:
    receive fraudulent activity information regarding fraudulent activity within or near a first area, the fraudulent activity information including a time the fraudulent activity occurred;
    receive mobile device information relating to a mobile device of a user, the mobile device information including a physical location of the mobile device at the time the fraudulent activity occurred;
    determine that the mobile device was physically located within or near the first area at the time the fraudulent activity occurred;
    receive subsequent fraudulent activity information regarding subsequent fraudulent activity within or near a second area, the subsequent fraudulent activity information including a time the subsequent fraudulent activity occurred;
    receive subsequent mobile device information relating, to the mobile device of the user, the subsequent mobile device information including a subsequent physical location of the mobile device at the time the subsequent fraudulent activity occurred;
    determine that the mobile device was physically located within or near the second area at the time the subsequent fraudulent activity occurred;
    responsive to determining that the mobile device was physically located within the first area at the time the fraudulent activity occurred and the second area at the time the subsequent fraudulent activity occurred, associate the fraudulent activity and the subsequent fraudulent activity with the mobile device; and
    in response to associating the fraudulent activity and the subsequent fraudulent activity with the mobile device and to detecting the mobile device within a detection area, provide a notification to a component proximate to the mobile device to alert the component of the association of the mobile device with the fraudulent and subsequent fraudulent activity.

2. The system of claim 1, wherein the identity management system is structured to be used in a financial institution environment.

3. The system of claim 1, wherein the identity management system is structured to be used in any location of interest.

4. The system of claim 1, wherein the notification includes levels of notification that correspond to levels of fraudulent activity predetermined by a financial institution.

5. The system of claim 4, wherein the levels of fraudulent activity are based on a severity of the fraudulent activity.

6. The system of claim 1, wherein the component includes at least one of a computer within the detection area or a mobile device of personnel known to work or be within the detection area, and wherein the notification includes at least one of a text message, a pop-up, or an email message to those personnel.

7. The system of claim 1, wherein the mobile device information includes information that is used to uniquely identify the mobile device, wherein the information includes at least one of an IP address, a phone number, radio-frequency identification, and near-field communication identification.

8. The system of claim 1, wherein the fraudulent activity information includes at least one of an account type, transaction information, and flagged fraudulent activity.

9. A method comprising:
  receiving, by an association circuit, fraudulent activity information regarding fraudulent activity within or near a first area, the fraudulent activity including a time the fraudulent activity occurred;
  receiving, by a detection circuit of an identity management system comprising one or more processors communicably and operatively coupled to a memory device, mobile device information relating to a mobile device of a user, the mobile device information including a physical location of the mobile device at the time the fraudulent activity occurred;

determining, by the identity management system, that the mobile device was physically located within or near the first area at the time the fraudulent activity occurred;

receiving, by an association circuit, subsequent fraudulent information regarding subsequent fraudulent activity or near a second area, the subsequent fraudulent activity information including a time the subsequent fraudulent activity occurred;

receiving, by the detection circuit, subsequent mobile device information relating to the mobile device of the user, the subsequent mobile device information including a subsequent physical location of the mobile device at the time the subsequent fraudulent activity occurred;

determining, by the identity management system, that the mobile device was physically located within or near the second area at the time the subsequent fraudulent activity occurred;

receiving, by the detection circuit, information indicative of the mobile device being detected within a detection area based on a wireless communication with the mobile device;

responsive to determining that the mobile device was physically located within the first area at the time the fraudulent activity occurred and the second area at the time the subsequent fraudulent activity occurred, associating, by fraud logic, the fraudulent activity and the subsequent fraudulent activity is with the mobile device; and in response to associating the fraudulent activity and the subsequent fraudulent activity with the mobile device and to receiving the information indicative of the mobile device being detected within a detection area, providing, by alert logic, a notification to a component proximate to the mobile device to alert the component of the association of the mobile device with the fraudulent and subsequent fraudulent activity.

10. The method of claim 9, wherein the identity management system is structured to be used in a financial institution environment.

11. The method of claim 9, wherein the identity management system is structured to be used in any location of interest.

12. The method of claim 9, wherein the component includes at least one of a computer within the detection area or a mobile device of personnel know to work or be within the detection area, and wherein the notification includes at least one of a text message, a pop-up, or an email message to those personnel.

13. The method of claim 9, wherein the mobile device information includes information that is used to uniquely identify the mobile device, wherein the information includes at least one of an IP address, a phone number, radio-frequency identification, and near-field communication identification.

14. The method of claim 9, wherein the fraudulent activity information includes at least one of an account type, transaction information, and flagged fraudulent activity.

* * * * *